(12) United States Patent
Schlipf

(10) Patent No.: US 8,809,750 B2
(45) Date of Patent: Aug. 19, 2014

(54) ELECTRIC HEATING DEVICE

(75) Inventor: Andreas Schlipf, Tuttlingen (DE)

(73) Assignee: Türk & Hillinger GmbH, Tuttlingen (DE)

( * ) Notice: Subject to any disclaimer, the term of this patent is extended or adjusted under 35 U.S.C. 154(b) by 325 days.

(21) Appl. No.: 13/011,257

(22) Filed: Jan. 21, 2011

(65) Prior Publication Data

US 2011/0180529 A1    Jul. 28, 2011

(30) Foreign Application Priority Data

Jan. 25, 2010    (DE) .................... 20 2010 001 370 U

(51) Int. Cl.
*H05B 3/40*    (2006.01)
*F24H 1/00*    (2006.01)

(52) U.S. Cl.
USPC .......................................... 219/534; 392/465

(58) Field of Classification Search
USPC .................. 219/534, 535; 392/465, 468, 469, 392/479–484
See application file for complete search history.

(56) References Cited

U.S. PATENT DOCUMENTS

| | | | |
|---|---|---|---|
| 3,515,837 A * | 6/1970 | Masao | ........................... 219/618 |
| 3,742,761 A | 7/1973 | Randall | |
| 6,410,894 B1 | 6/2002 | Hoffmann et al. | |
| 2009/0032519 A1 | 2/2009 | Schlipf | |

FOREIGN PATENT DOCUMENTS

| | | |
|---|---|---|
| DE | 21 41 707 A1 | 2/1973 |
| DE | 100 59 885 C1 | 7/2002 |
| DE | 103 33 206 A1 | 4/2004 |
| DE | 103 33 206 B4 | 4/2004 |
| DE | 202007010865 U1 | 10/2007 |
| GB | 1 83 148 A | 7/1922 |
| WO | WO 02/32190 A2 | 4/2002 |

OTHER PUBLICATIONS

English Machine translation for DE 20 2007 010 865 of Nov. 15, 2007.*

* cited by examiner

*Primary Examiner* — Sang Y Paik
(74) *Attorney, Agent, or Firm* — McGlew and Tuttle, P.C.

(57) ABSTRACT

An electric heater (10, 20, 30, 40, 60, 70, 80), especially for heating surfaces of components, is provided with an inner metal jacket (11, 21, 31, 41, 61, 71, 81) and an outer metal jacket (14, 24, 34, 44, 64, 74, 84), which are arranged relative to one another such that a space is present between the inner metal jacket (11, 21, 31, 41, 61, 71, 81) and outer metal jacket (14, 24, 34, 44, 64, 74, 84). At least one heat conductor (13, 23, 33, 43, 63, 73, 83) is arranged at least in some sections in the space between the inner metal jacket (11, 21, 31, 41, 61, 71, 81) and outer metal jacket (14, 24, 34, 44, 64, 74, 84). At least two spacers (12, 22, 32, 36, 42, 62, 72, 82), arranged between the heat conductor (13, 23, 33, 43, 63, 73, 83) and inner metal jacket (11, 21, 31, 41, 61, 71, 81) are provided, over which the sections of the heat conductor (13, 23, 33, 43, 63, 73, 83) are guided.

22 Claims, 11 Drawing Sheets

ELECTRIC HEATING DEVICE

CROSS REFERENCE TO RELATED APPLICATIONS

This application claims the benefit of priority under 35 U.S.C. §119 of German Utility Model 20 2010 001 370.4 filed Jan. 25, 2010, the entire contents of which are incorporated herein by reference.

FIELD OF THE INVENTION

The present invention pertains to an electric heater with an inner jacket surface and an outer metal jacket with a space present between the inner metal jacket and the outer metal jacket and a heat conductor arranged at least in some sections in the space between the inner metal jacket and the outer metal jacket and to a process for manufacturing such an electric heater.

BACKGROUND OF THE INVENTION

Such heaters are used, for example, to heat tools, machine parts and apparatuses, especially plastic injection nozzles. However, the use of such heaters is not limited to this purpose; for example, it is possible to bring fluids to a desired temperature by passing them though this type of heater. As an alternative, stagnant fluids or an expanding wax can also be brought to a desired temperature.

Especially popular embodiments of such heaters are those with a cylindrical geometry.

The prior-art heaters comprise, as a rule, two jacket surfaces, which are arranged at spaced locations from each other and between which at least one heat conductor is arranged in an insulated manner. The heat conductor may be in the form of a band or wire or another resistance wire. The "inner jacket surface" is always defined within the framework of the present application as a jacket surface that is in contact with the component to be heated or is formed by the component to be heated itself; the "outer jacket surface" correspondingly faces away from the component to be heated.

It is known from the state of the art, e.g., DE 103 33 206 B4, to arrange the heat conductor on an insulating, especially tubular, coil body or carrier, which is then arranged between the boundary surfaces.

It is also desirable at the same time that the heating output of the heat conductor be transmitted to the inner boundary surface as directly and homogeneously as possible and that the most space-saving and compact embodiment possible is obtained. This objective can be accomplished with the use of a coil body or carrier to a limited extent only, because, on the one hand, it must have the necessary mechanical stability and, on the other hand, it must have sufficiently high manufacturing tolerances to permit installation of the coil body or carrier in the electric heater despite deviations in its roundness from the ideal shape, its deflection and possible variations in diameter over the length of the body. In particular, its internal diameter must additionally also have so much clearance that deflection and circularity error of the inner jacket surface are absorbed. Narrow gaps may form at least locally between the coil body or carrier, on the one hand, and the inner jacket surface, on the other hand, which prevent good and homogeneous transmission of the heat output and lead to inhomogeneities during the compaction of the heating element.

Even if filling with a powder or granular material is performed, it frequently happens that an air cushions will remain. If a subsequent compaction is then performed on a setting plug, a jacket surface may form folds, which makes the heater unfit for use or impairs the heat transfer to the object to be heated.

SUMMARY OF THE INVENTION

The object of the present invention is therefore to provide an electric heater, which can be manufactured in a favorable manner, with a very small cross section and high precision in terms of the reproducibility of the temperature distribution.

According to the present invention, an electric heater is provided that has an inner metal jacket and an outer metal jacket, which are arranged relative to each other such that a space is present between the inner metal jacket and the outer metal jacket. It is now possible, in particular, that the inner metal jacket of the electric heater is formed by a component to be heated, especially a metallic surface thereof.

Furthermore, it has at least one heat conductor arranged at least in some sections in the space between the inner metal jacket and outer metal jacket.

It is essential for the present invention that at least two spacers, which are arranged between the heat conductor and the inner metal jacket, and over which the sections of the heat conductor are guided, are provided.

Guiding over a spacer means that the section of the heat conductor in question extends on a section of the outer circumference of the spacer.

The use of at least two separate spacers makes it unnecessary to maintain the manufacturing tolerances, which are inevitable with the use of an individual, tubular spacer, which leads to a more compact form of construction. The advantage of this arrangement is consequently that a very short distance between the heat conductor and the inner and/or outer metal jacket can be obtained in a simple manner, so that an electric heater with very small wall thickness can be embodied.

In an especially preferred embodiment, an unguided section of the heat conductor, in which the heat conductor is not guided over a spacer, is present between two guided sections of the heat conductor at least before pressing the electric heater. The provision of such unguided sections makes it possible for a space to be present, through which a filling material can reliably enter possible air gaps, so that a homogeneous filling without air gaps can be obtained at the time of the subsequent compaction.

Due to compaction during the manufacturing process, it may happen in the finished heater, especially on a setting plug, that the spacers are in direct or nearly direct contact with one another, so that unguided sections can only be recognized as a seam.

It is especially advantageous in respect to achieving an especially homogeneous heat distribution over the circumference of the component to be heated if the spacers are arranged equidistantly from one another when using a plurality of spacers.

An especially simple possibility of fixing the spacers is to fix the spacers by mechanically stressing the heat conductor at the inner jacket surface of the electric heater. Winding the heat conductor under tension leads to a simple and reliable fixation of the assembly unit comprising the inner jacket surface, spacer and heating wire winding. This is especially important from the viewpoints of manufacturing technology, because fixation of these components is guaranteed hereby until an additional fixation by filling and compacting the heater.

An especially good heat conduction, which can be manufactured in a simple manner, can be guaranteed over the entire circumference of the component to be heated by the space between the inner metal jacket and the outer metal jacket in the area between the spacers being filled completely or partly with a material, especially a powder or granular material. Complete or partial compaction of the electric heater can also contribute to such an effect. This is carried out in an especially preferred manner on a calibrating mandrel or setting plug.

It is especially advantageous if the spacers of the compacted heater are arranged at the shortest possible distance from each other and especially if the spacers touch each other after the compaction. High level of safety against voltage breakdowns from the heat conductor to the inner jacket surface is obtained thereby.

Especially suitable embodiments are obtained concerning the material of which the powder or granular material consists if the powder or granular material consists of a metal oxide, especially magnesium oxide, a quartz sand or a ceramic compound.

It is especially favorable if the spacers consist of an electrically insulating material. The materials used are, furthermore, advantageously heat-resistant and have the best possible heat conduction; in particular, ceramics, micanite, polyimides and similar materials are considered. Particularly well suited are especially ceramics that preferably are also partly porous or porous and not densely sintered.

If at least one spacer has at least one hole, this makes possible the insulated return of the heat conductor or at least of a conductor that is in electric contact with this to the terminal. If a hole, in which at least one end of the heat conductor is received, is provided in at least one of the spacers, it is made possible for the heat conductor winding to remain fixed under tension after winding and the winding will not open up. Fixation will become especially good if both ends of the heat conductor are inserted into a hole each. An especially good way of preparing an electric contact to the heat conductor is to make available for this purpose at least one auxiliary wire, preferably one with good conductivity and/or large cross section, which is brought into intimate contact with the heat conductor, which usually has a high ohmic resistance. This can be achieved especially by the heat conductor and auxiliary wire being twisted, welded, crimped or press-contacted with one another.

In an advantageous embodiment of the heat conductor, said heat conductor has two connecting conductors, with which a supply voltage can be applied to the heat conductor. As an alternative, a voltage supply can be guaranteed with protective voltage by providing only a connecting conductor for applying the supply voltage and the inner or outer jacket surface can be used as a return conductor.

It is especially advantageous to provide a thermocouple at the electric heater. It is advantageous to arrange this in a hole of the spacer or of one of the spacers.

Special flexibility is obtained concerning temperature profiles that can be obtained if more than one heat conductor is provided. Individual areas of the heater can be energized hereby separately. It is also possible to connect a plurality of heating wire windings preferably in parallel.

An embodiment, which makes it possible to set the distance between the heat conductor and the inner or outer metal jacket especially precisely, can be obtained if the surface of the side of the spacers that is in contact with the inner metal jacket or outer metal jacket is adapted to the contour of the inner or outer metal jacket.

Especially good safety against possible voltage breakdowns is given in an embodiment in which the assembled surfaces of the sides of the spacers that are in contact with the inner metal jacket or outer metal jacket nearly completely cover the inner or outer metal jacket.

The present invention will be explained in more detail below on the basis of drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
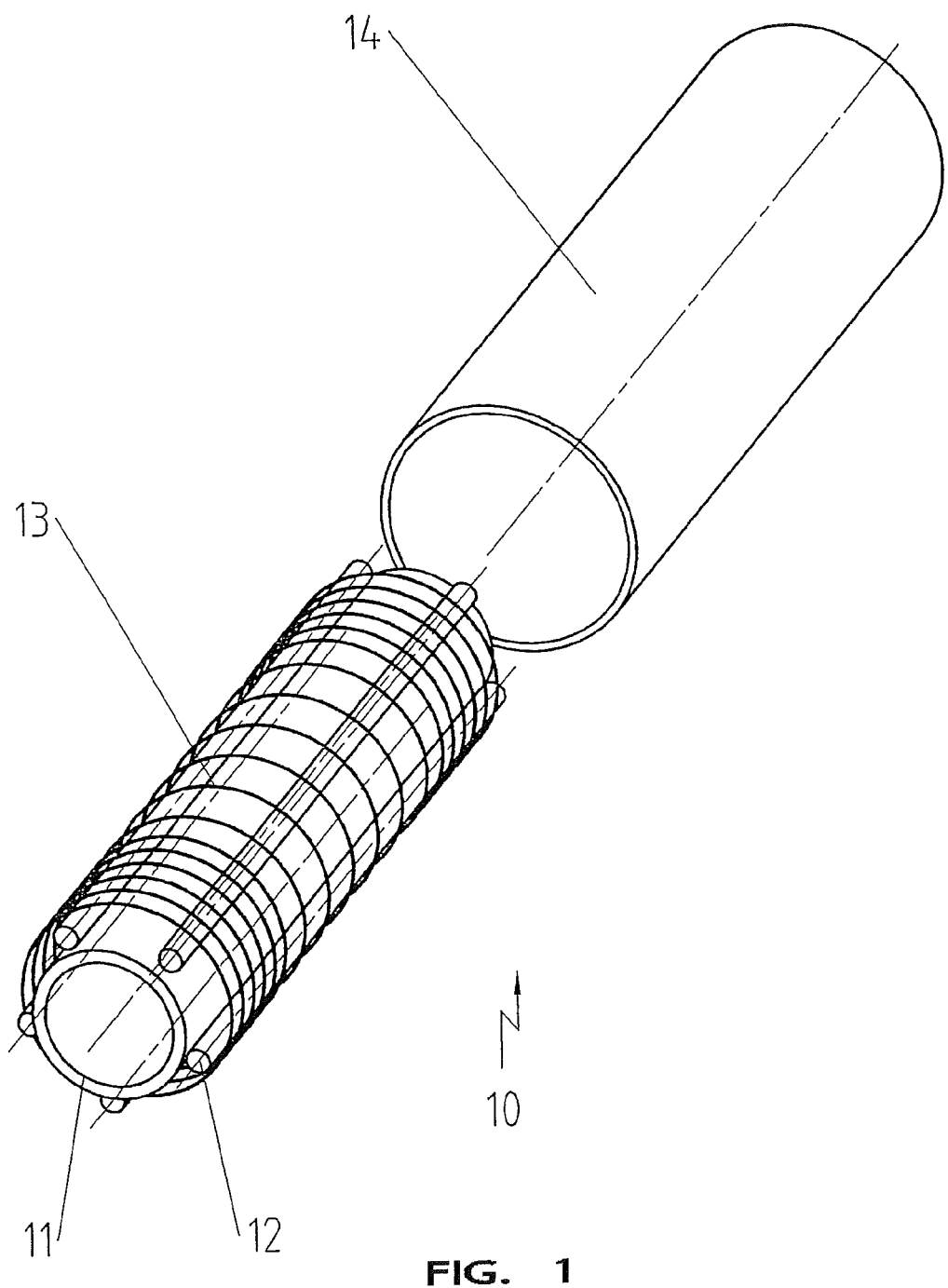
FIG. 1 is an exploded perspective view of a first exemplary embodiment of an electric heater with the outer metal jacket removed and without filling material.

Referring to the drawings in particular, identical reference numbers are used in all figures for identical components in the same exemplary embodiments. Representation of the connections of the heat conductors is always omitted except in FIGS. 10 and 11 in order not to jeopardize the clarity of the views.

FIG. 1 shows an electric heater 10 with a cylindrical inner metal jacket 11, on which five cylindrically shaped spacers 12 are arranged such that the same distance is present between two adjacent spacers 12 each, so that the spacers 12 are arranged equidistantly. A heat conductor 13 is guided in a helically coiled form around the spacers 12, the heat conductor being under tensile stress, so that a radial pressure is exerted on the spacers 12, which fixes same. To illustrate the design, the likewise cylindrical outer metal jacket 14, which is arranged coaxially with the inner metal jacket 11, is shown retracted in the manner of an exploded view, and a filling of the space not filled by spacers 12 or heat conductors 13 with a material, which is an electrically insulating material here, is not shown.

It is likewise not shown that the heat conductor 13 is in contact with electric terminals, which are led out of the heater. This correspondingly applies to FIGS. 3, 5 and 7.

Figure 2:
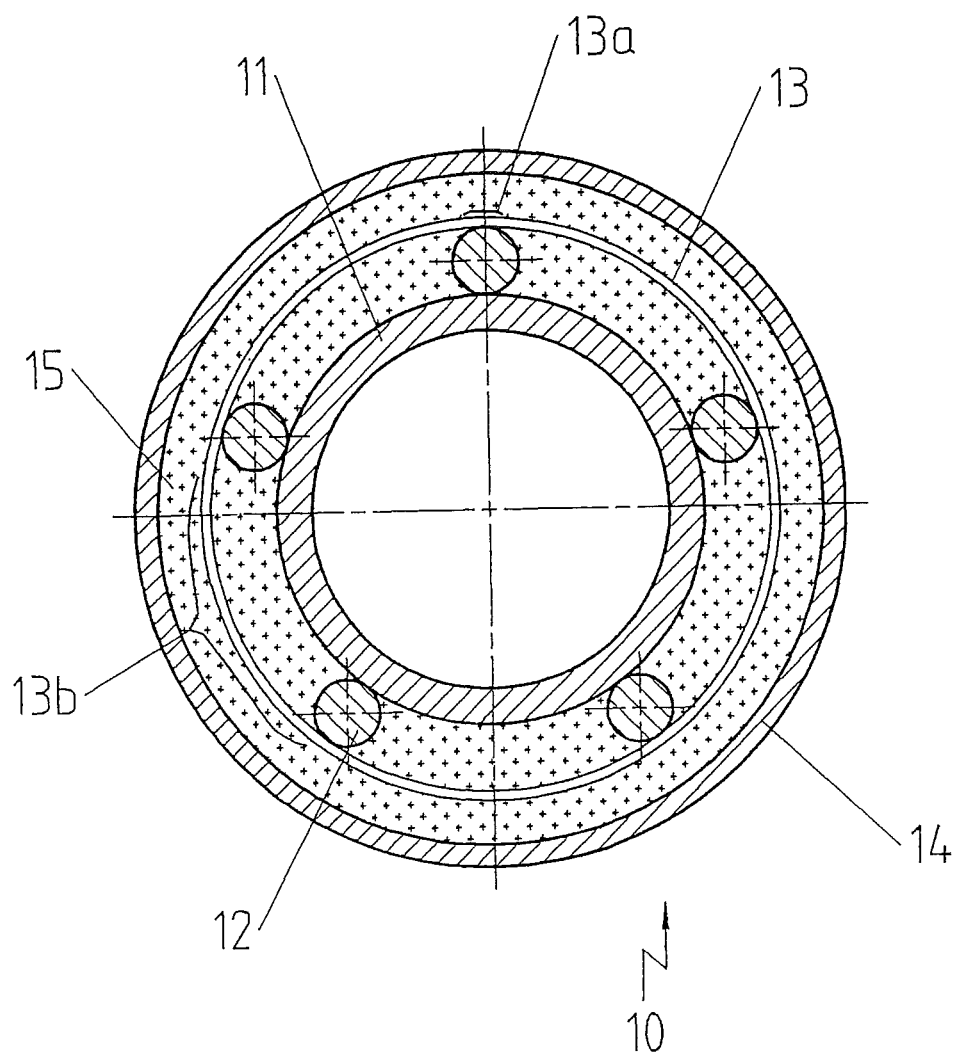
FIG. 2 is a cross-sectional view of the exemplary embodiment from FIG. 1.

FIG. 2 shows a cross section through an electric heater 10 from FIG. 1 in the assembled state. Besides the inner metal jacket 11 and five cylindrical spacers 12 arranged thereon, an individual winding of the helix of the heat conductor 13 is recognized in this view, but the pitch of the helix, which is due to the fact that the winding of the helix is not actually located in exactly the same plane as the section plane shown, is not shown in order not to jeopardize the clarity of the view. It is, further, recognized in this view that the heat conductor 13 has alternatingly guided sections 13a, in which it is guided on the spacers 12, and unguided sections 13b, in which it is not guided on the spacers 12, so that an unguided section 13b is located between each two guided sections 13a. The outer metal jacket 14 can be seen as well. In the view according to FIG. 2, the filling of the space remaining between the inner metal jacket 11 and outer metal jacket 14, which space cannot be recognized in the figures because of the filling, can be recognized especially clearly due to the material 15, which is an electrically insulating material here.

Figure 3:
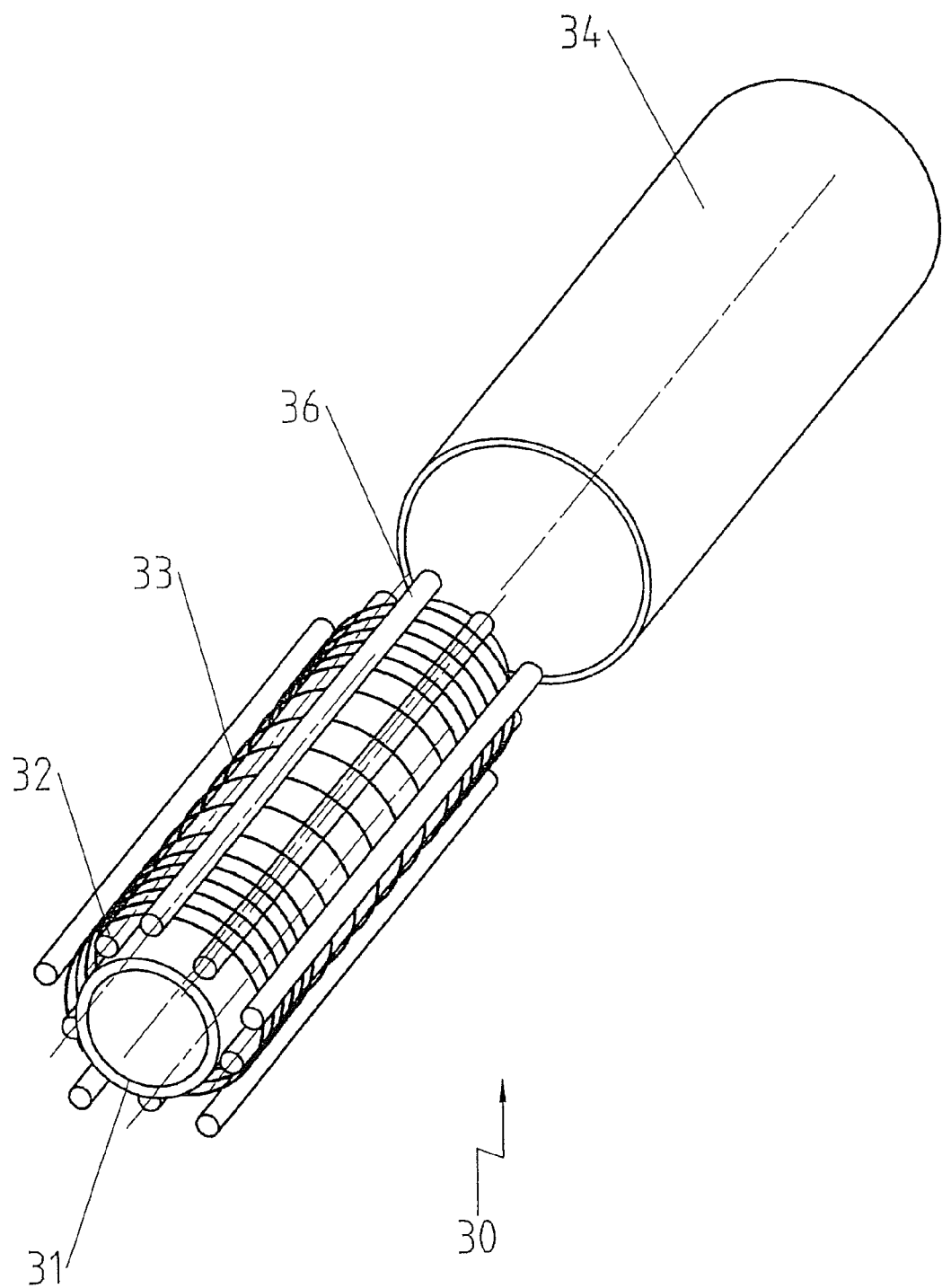
FIG. 3 is an exploded perspective view of a second exemplary embodiment of an electric heater with the outer metal jacket removed and without filling material.
Figure 4:
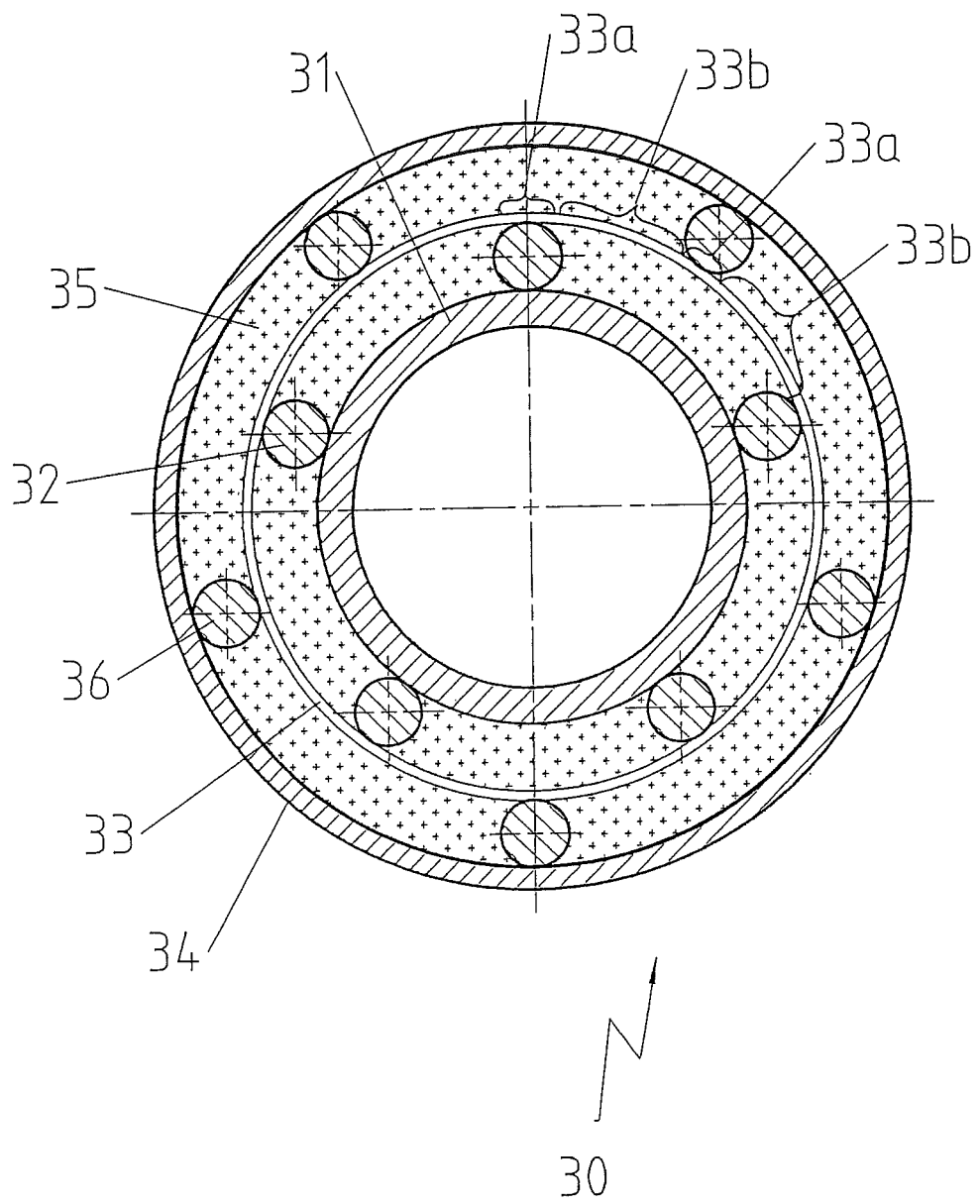
FIG. 4 is a cross-sectional view of the exemplary embodiment from FIG. 3.

FIGS. 3 and 4 show a second embodiment of an electric heater 30. This embodiment corresponds, in terms of the arrangement of the inner metal jacket 31 and outer metal jacket 34, five cylindrical spacers 32 and heat conductor 33 as well as filling material 35, which is shown in FIG. 4 only, essentially to the embodiment shown in FIGS. 1 and 2. It differs from the embodiment shown in FIGS. 1 and 2 only in that five more spacers 36 are provided, which are arranged between the heat conductor 33 and outer metal jacket 24. It is especially advantageous in this arrangement, in particular, the fact that especially strong pressing forces can be sent hereby to the respective spacers 32, 36, which ensures a small, uniform distance between the spacers 32, 36 and inner jacket surface 21.

Figure 5:
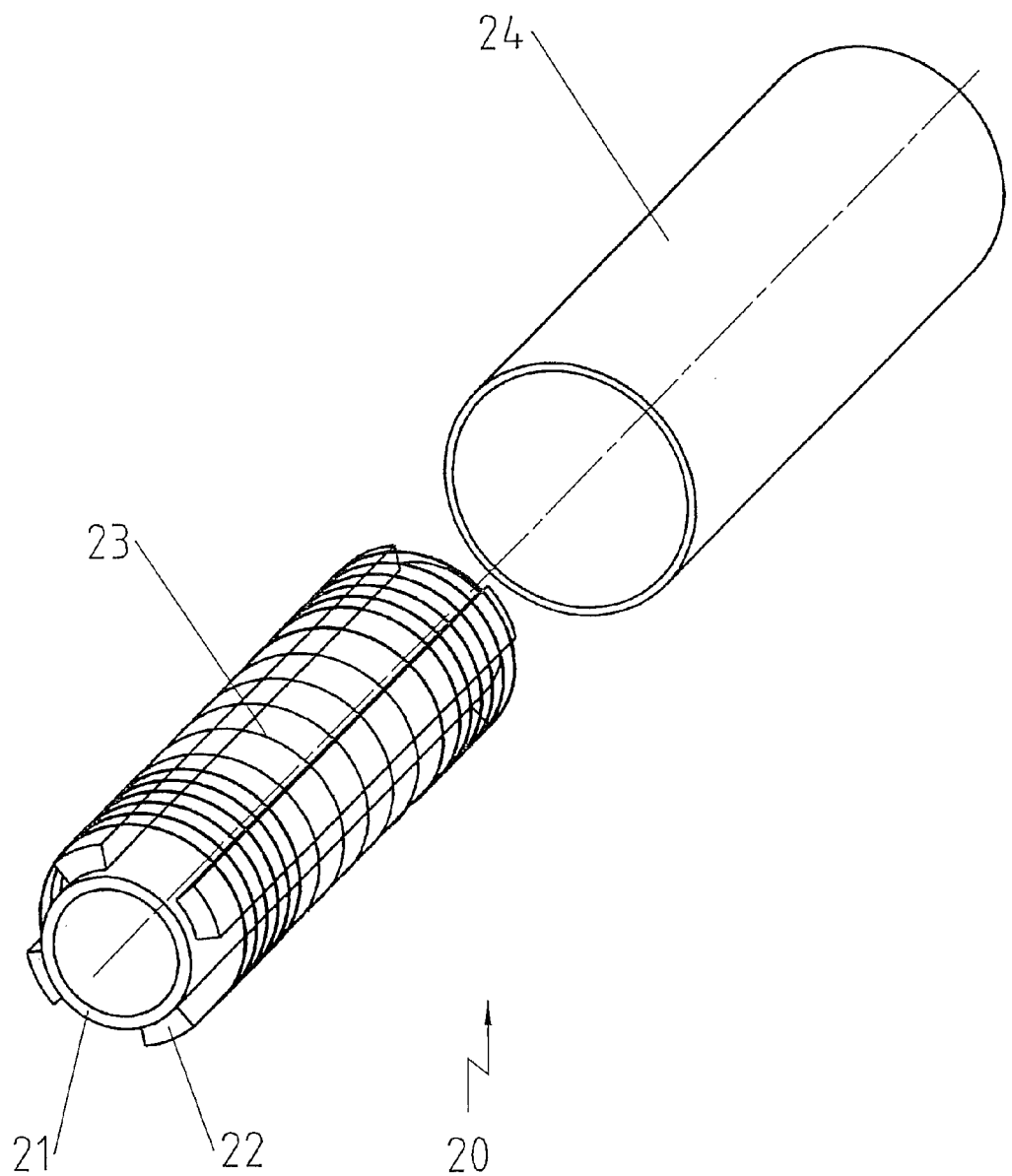
FIG. 5 is an exploded perspective view of a third exemplary embodiment of an electric heater with the outer metal jacket removed and without filling material.

FIG. 5 shows a third embodiment of an electric heater 20 with a cylindrical inner metal jacket 21, on which four spacers 22 are arranged such that the same distance is present between two adjacent spacers 22 each, so that there is an equidistant arrangement of spacers 22. The spacers 22 are designed here in the form of a segment of a tube wall, so that a contact surface, which is not recognized in FIG. 5 and is adapted to the contour of the inner metal jacket 21, is formed between the spacer 22 and inner metal jacket 21. A heat conductor 23, which is under tensile stress, is guided helically wound around the spacers 22, so that a radial pressure, which fixes the spacers 22 at the inner metal jacket 21, is exerted on said spacers 22. To illustrate the design, the likewise cylindrical outer metal jacket 24, arranged coaxially with the inner metal jacket 21, is shown retracted in the manner of an exploded view, and a filling of the space not filled out by spacers 22 or heat conductors 23 with a material, which is an electrically insulating material here, is not shown.

Figure 6:
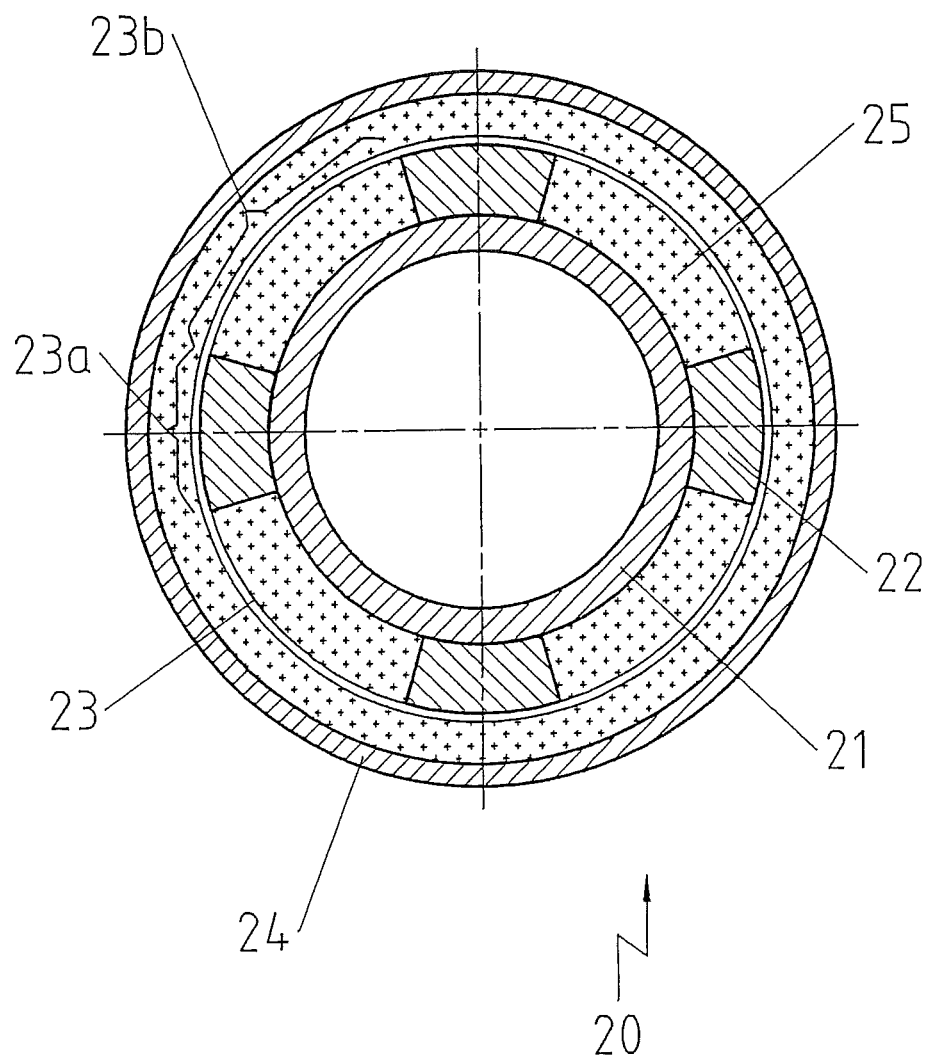
FIG. 6 is a cross-sectional view of the exemplary embodiment from FIG. 5.

FIG. 6 shows a cross section through an electric heater 20 from FIG. 5 in the assembled state. Besides the inner metal jacket 21 and the four tube segment-shaped spacers 22, a single winding of the helix of the heat conductor 23 is recognized in this view, but the pitch of the helix, which is due to the fact that the winding of the helix is not actually located exactly coplanar with the section plane shown, is not shown in order not to jeopardize the clarity of the view. It is, further, recognized in this view that the heat conductor 23 has alternatingly guided sections 23a, in which it is guided on the spacers 22, and unguided sections 23b, in which it is not guided on the spacers 22, so that an unguided section 23b each is located between two guided sections 23a. The outer metal jacket 24 can be seen as well. The filling of the space, which remains between the inner metal jacket 21 and outer metal jacket 24 but cannot be recognized in the figures because of the filling, can be recognized especially clearly in the view according to FIG. 6 due to the material 25, which is an electrically insulating material in this case.

Figure 7:
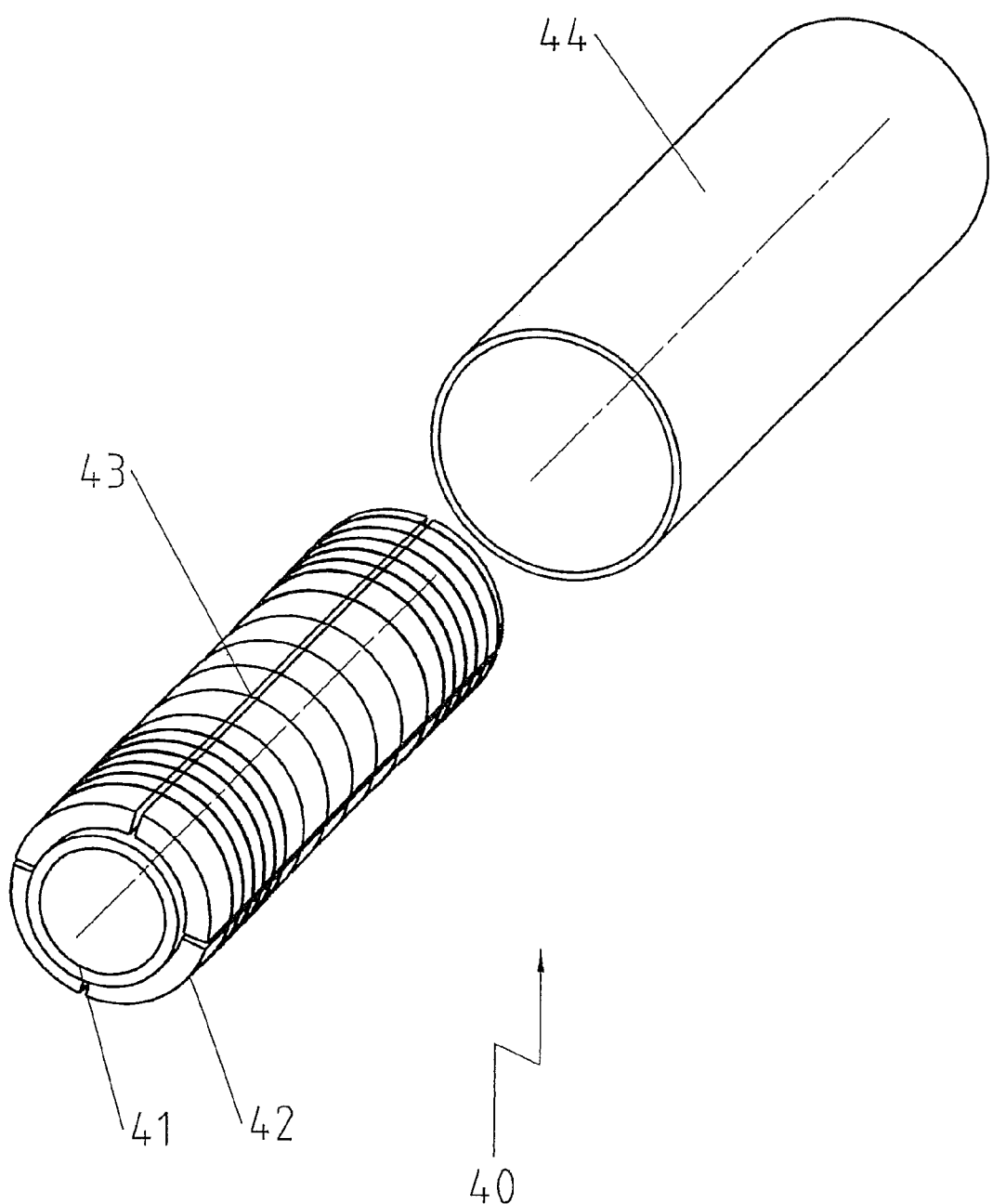
FIG. 7 is an exploded perspective view of a fourth exemplary embodiment of an electric heater with the outer metal jacket removed and without filling material.
Figure 8:
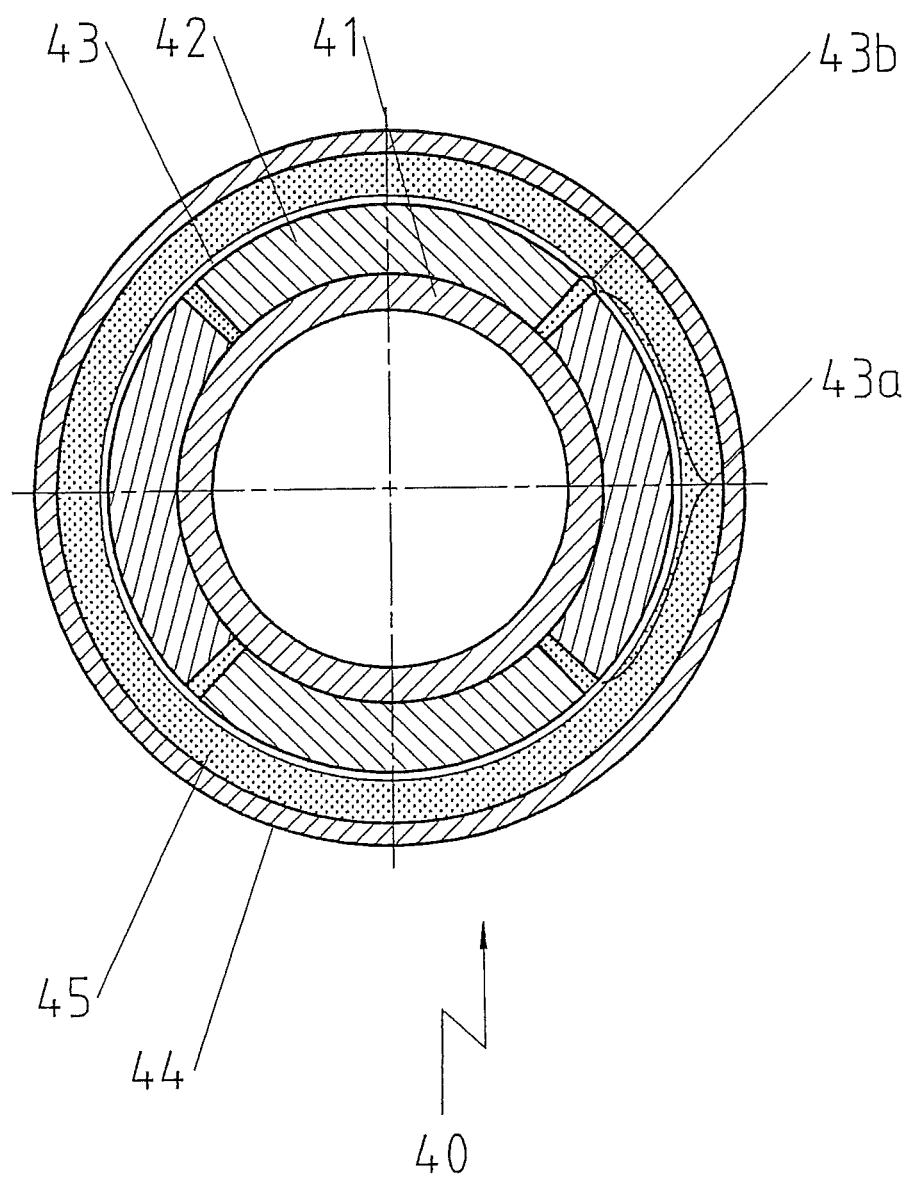
FIG. 8 is a cross-sectional view of the exemplary embodiment from FIG. 7.

FIGS. 7 and 8 show a fourth exemplary embodiment of an electric heater 40. This embodiment corresponds in terms of the arrangement of the inner metal jacket 41 and outer metal jacket 44, four spacers 42 and heat conductors 43, as well as filling material 45, which is shown in FIG. 8 only, essentially to the embodiment shown in FIGS. 5 and 6. It differs from this only in that the shape of the spacers 42 is selected here to be such that the inner metal jacket 41 is covered nearly completely. This offers the advantage that the risk of possible electric breakdowns between the heat conductor 43 and inner metal jacket 41 is greatly reduced. It is ideal if the distance between mutually adjacent spacers 42 is as small as possible, especially smaller than 1 mm, or they touch each other in a compacted heater in the state of pressing by the heat conductor 43.

Figure 9:
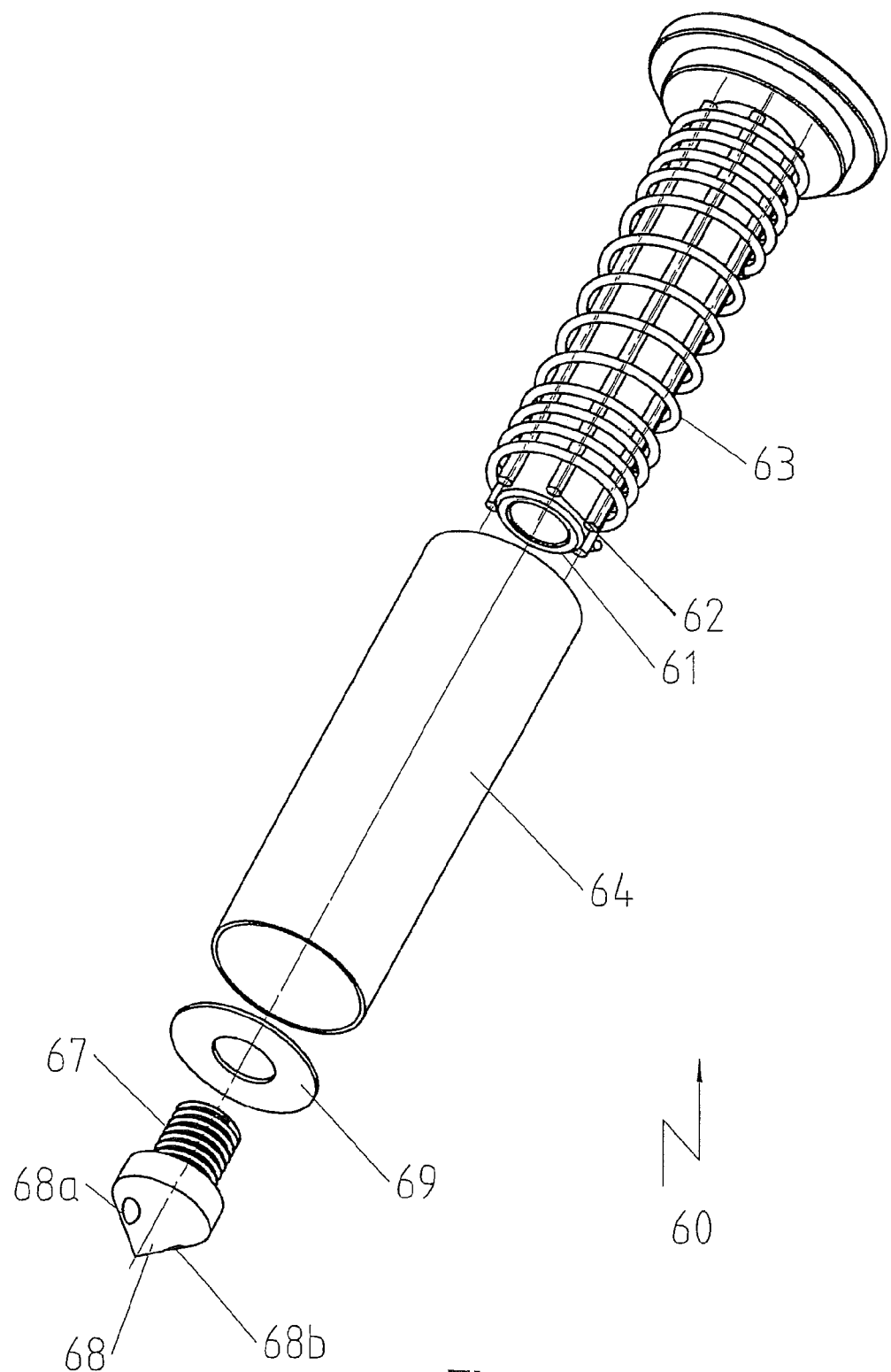
FIG. 9 is an exploded perspective view of a variant of the electric heater according to the first exemplary embodiment, which is integrated in a nozzle.

FIG. 9 shows an exploded view of a variant of the electric heater according to the first exemplary embodiment, which variant is integrated in a nozzle, as it can be used, e.g., for apparatuses for injection molding. The inner jacket surface 61 of the electric heater 60 is formed by the nozzle body, through which passes the duct 66 for the material to be injected. The closure of the duct 66 is formed by the nozzle head 68 with injection openings 68a and 68b, which are in connection with the duct 66, said nozzle head 68 being preferably able to be screwed into the duct 66 by means of thread 67.

The arrangement of the heat conductor 63 and spacers 62 on the inner jacket surface 61 is identical to the arrangement explained in the description of FIGS. 1 and 2. This arrangement is enclosed by the outer jacket surface 64, which is closed on the front side by the ring disk 69. The space between the inner jacket surface 61 and outer jacket surface 64 is filled with an electrically insulating powder or granular material, not shown.

Figure 10:
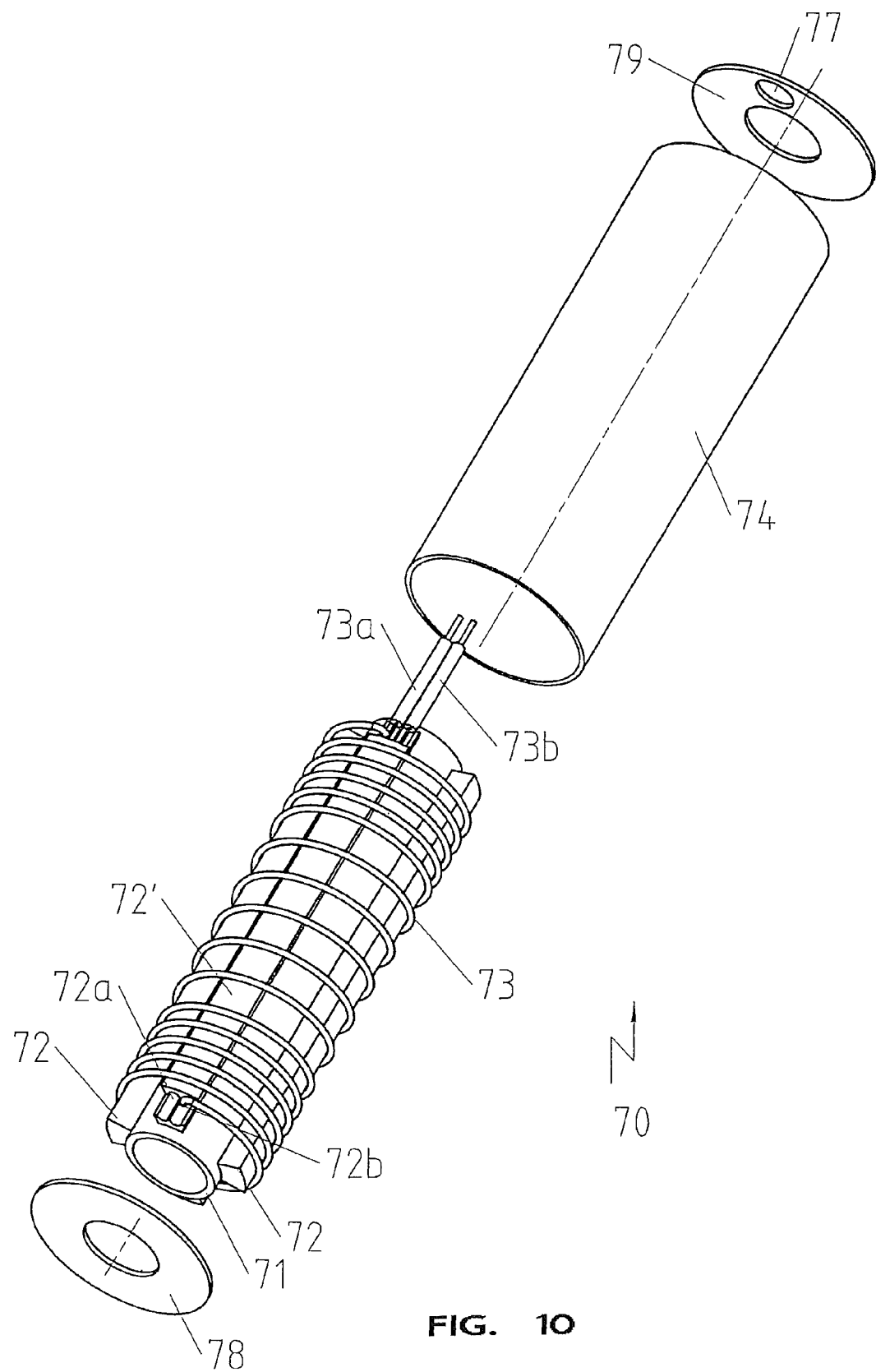
FIG. 10 is an exploded perspective view of a variant of the third exemplary embodiment of the electric heater.

FIG. 10 shows an exploded view of a variant of the third exemplary embodiment of the electric heater. The electric heater 70 shows an arrangement of inner metal jacket 71 and outer metal jacket 74, spacers 72, 72' and heat conductors 73, which corresponds to the embodiment described above on the basis of FIGS. 5 and 6. It differs from the embodiment shown in FIGS. 5 and 6 only in that a spacer 72' has two holes 76a, 76b, which pass through the spacer 72' along the direction in which said spacer extends, which direction is preset by the longitudinal axis of the cylindrical heater 70. The terminals 73a, 73b led out of the heater 70 are in electric contact with the heat conductor 73.

In addition, FIG. 10 shows ring disks 78, 79, which form a front-side and end-side closure between the inner metal jacket 71 and outer metal jacket 74 and form a mechanical protection and protection against the entry of media. The terminal-side closing disk 78 has a passage opening for the terminals 73a, 73b.

Figure 11:
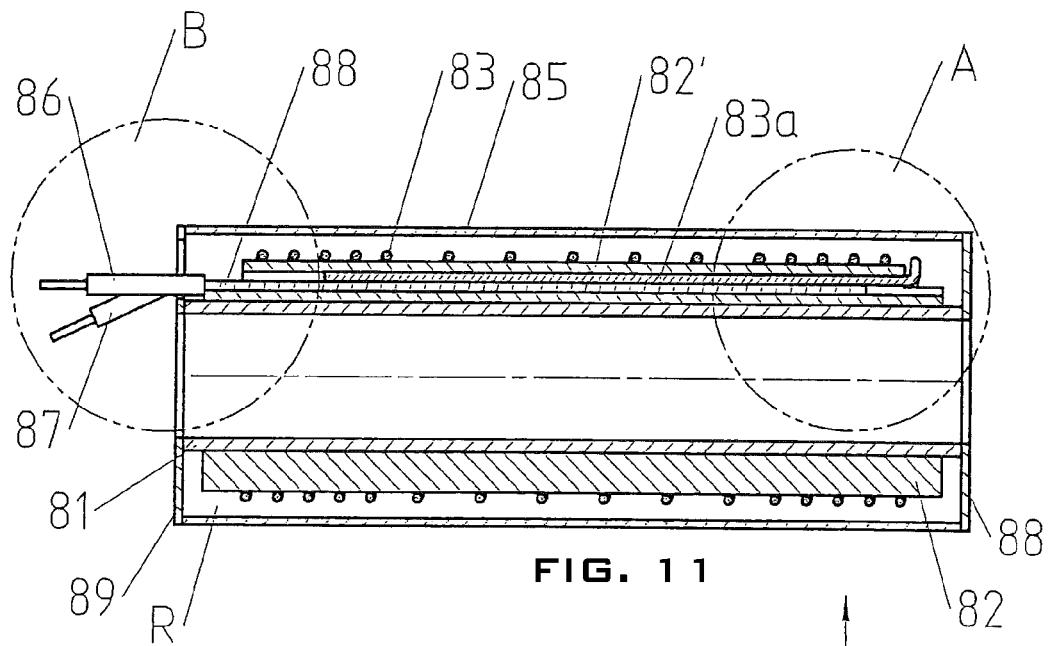
FIG. 11 is a sectional view of the electric heater showing a preferred contacting possibility for the heat conductor.
Figure 11B:
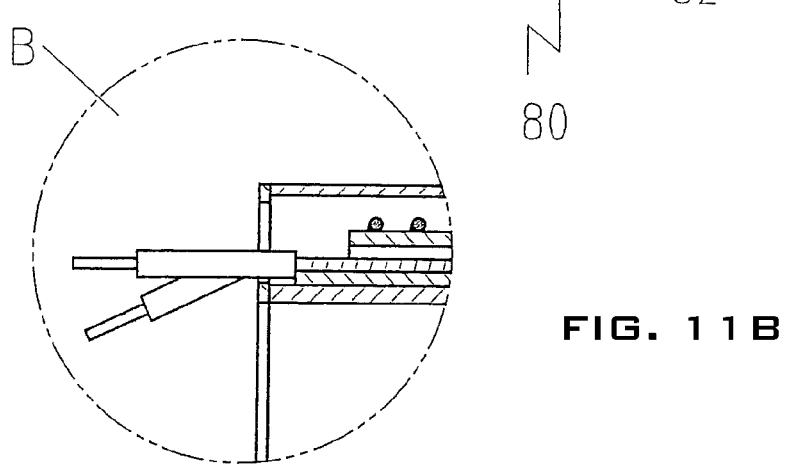
FIG. 11B is a detail view from region B of FIG. 11 showing the preferred contacting possibility for the heat conductor.
Figure 11A:
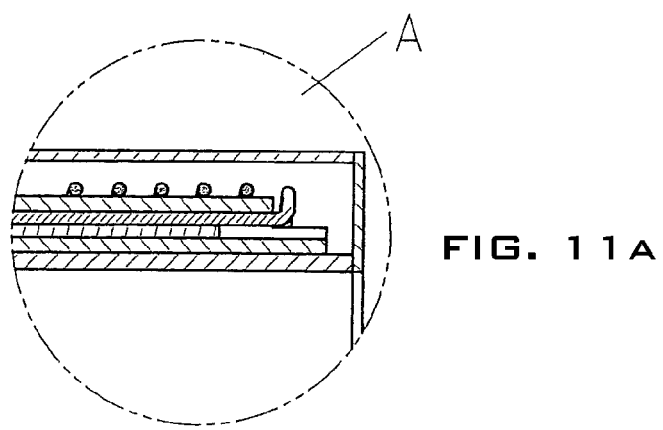
FIG. 11A is a detail view from region A of FIG. 11 showing the preferred contacting possibility for the heat conductor.

FIG. 11 is a detail view of a preferred contacting possibility for the heat conductor. A cross section through an electric heater 80 is recognized with an inner jacket surface 81, with an outer jacket surface 84 concentrically surrounding the inner jacket surface 81, ring disks 88 and 89, which connect the inner jacket surface 81 and outer jacket surface 84 to one another on the front side and on the terminal side and close the space R formed between these, which is preferably filled with an electrically insulating powder or granular material, not shown. Spacers 82, 82' are pressed to the surface of the inner jacket surface 81 facing the outer jacket surface 84 by the mechanical stress of a helically wound heat conductor 83.

Terminals 86, 87 are led through an opening in the ring disk 89 and pass over into an auxiliary wire 88 consisting of a material with high conductivity, which is inserted into a hole in spacer 82'. An end section 83a of the heat conductor 83 is likewise guided in this hole. An intimate contact is ensured between the auxiliary wire 88 and end section 83a of the heat conductor 83 by mechanical stress of the heat conductor 83, which acts on spacer 82'. Letter B shows an enlarged detail of the insertion area of the auxiliary wire 88. Letter B shows an enlarged detail of the area in which the heat conductor 83 leaves the hole and the winding around the spacers 82, 82' begins.

While specific embodiments of the invention have been described in detail to illustrate the application of the principles of the invention, it will be understood that the invention may be embodied otherwise without departing from such principles.

APPENDIX

List of Reference Numbers

| | |
|---|---|
| 10, 20, 30, 40, 60, 70, 80 | Electric heater |
| 11, 21, 31, 41, 61, 71, 81 | Inner metal jacket |
| 11, 22, 32, 36, 42, 62, 72, 72', 82, 82' | Spacer |
| 13, 23, 33, 43, 63, 73, 83 | Heat conductor |
| 13a, 23a, 33a, 43a | Guided section |
| 13b, 23b, 33b, 43b | Unguided section |
| 14, 24, 34, 44, 64, 74, 84 | Outer metal jacket |
| 15, 25, 35, 45 | Electrically insulating material |
| 66 | Duct |
| 67 | Thread |
| 68 | Nozzle head |
| 68a, b | Injection opening |
| 69, 78, 79, 88, 89 | Ring disk |
| 73a, b | Terminal |
| 76a, b | Hole |
| 77 | Passage opening |
| 83a | End section |
| 86, 87 | Terminal |
| 88 | Auxiliary wire |
| A, B | Enlarged detail |

What is claimed is:

1. An electric heater for heating surfaces of components, the electric heater comprising:
   an inner jacket with an inner jacket surface;
   an outer metal jacket arranged relative to the inner jacket surface such that a space is present between the inner metal jacket and outer metal jacket;
   at least one heat conductor arranged with heat conductor sections in the space between the inner metal jacket and the outer metal jacket;
   at least two spacers between the heat conductor and the inner metal jacket, said at least two spacers comprising a first spacer and a second spacer, at least some of the heat conductor sections being guided sections, with each of the guided sections being guided over one of the at least two spacers, at least two of said guided sections being arranged on said first spacer, said heat conductor sections comprising unguided sections, in which the heat conductor is not guided over one of the spacers, each of said unguided sections being present between two of said guided sections, said at least two of said guided sections being separated from each other via at least one of said guided sections guided on said second spacer and one or more said unguided sections.

2. An electric heater in accordance with claim 1, wherein the spacers are arranged equidistantly from each other in a circumferential direction with respect to a longitudinal axis of said inner metal jacket, each of said spacers extending in an axial direction of said inner metal jacket, each of said guided sections engaging at least a portion of one of said spacers, each of said unguided sections being free of contact with said spacers.

3. An electric heater in accordance with claim 1, wherein the spacers are fixed by a mechanical stress of the heat conductor on the inner jacket surface.

4. An electric heater in accordance with claim 1, wherein in an area between the spacers, the space between the inner metal jacket and the outer metal jacket is completely or partly filled with a material comprising a powder material or a granular material.

5. An electric heater in accordance with claim 4, wherein the electric heater is compacted fully or partly on a calibrating mandrel.

6. An electric heater in accordance with claim 5, wherein the spacers of the compacted heater touch each other.

7. An electric heater in accordance with claim 5, wherein the powder material or granular material is at least one of a metal oxide, magnesium oxide, a quartz, sand or a ceramic compound.

8. An electric heater in accordance with claim 1, wherein the spacers consist essentially of an electrically insulating material.

9. An electric heater in accordance with claim 1, further comprising at least one connection, which is in electric contact with the heat conductor, wherein at least one of the spacers has at least one hole, through which the at least one connection is led out of the electric heater.

10. An electric heater in accordance with claim 1, wherein at least one of the spacers has at least one hole, in which at least one end of the heat conductor is received.

11. An electric heater in accordance with claim 1, further comprising at least one auxiliary wire for contacting the heat conductor, the auxiliary wire being in intimate contact, in a twisted, welded, crimped or press-contacted manner, with the heat conductor.

12. An electric heater in accordance with claim 1, wherein the heat conductor has two terminals, at which a supply voltage is applied to the heat conductor.

13. An electric heater in accordance with claim 1, wherein:
   the heat conductor has only one connecting conductor, at which a protective voltage is applied as a supply voltage; and
   the inner jacket surface or the outer jacket surface is used as a return conductor.

14. An electric heater in accordance with claim 1, wherein the electric heater has a thermocouple.

15. An electric heater in accordance with claim 14, wherein the thermocouple is guided in a hole in one of the spacers.

16. An electric heater in accordance with claim 1, further comprising another heat conductor to provide a plurality of heat conductors.

17. An electric heater in accordance with claim 1, wherein a surface of a side of the spacers, which is in contact with the inner metal jacket, is adapted to the contour of the inner metal jacket.

18. An electric heater in accordance with claim 17, wherein the assembled surfaces of the sides of the spacers, which are in contact with the inner metal jacket, substantially cover the inner metal jacket.

19. An electric heater, the electric heater comprising:
an inner jacket with an inner jacket surface;
an outer metal jacket, the outer jacket being arranged relative to the inner jacket surface to define a space between the inner metal jacket and outer metal jacket;
spacers between the heat conductor and the inner metal jacket;
a heat conductor arranged in the space between the inner metal jacket and the outer metal jacket, the heat conductor including heat conductor guided sections and heat conductor unguided sections, each of said heat conductor guided sections being guided over a corresponding one of the spacers, each of said heat conductor unguided sections bridging an unsupported spacer region between one of said spacers and another one of said spacers, each of said unguided sections being located at a spaced location from each of said spacers, said spacers comprising a first spacer and a second spacer, said heat conductor comprising a heat conductor portion, said heat conductor portion extending from one portion of said first spacer to another portion of said first spacer, wherein at least a portion of said heat conductor portion is guided over said second spacer.

20. An electric heater in accordance with claim 19, wherein each of said spacers extends in an axial direction of said inner metal jacket, each of said spacers being located at a circumferentially spaced location from another one of said spacers with respect to a longitudinal axis of said inner metal jacket, each of said heat conductor unguided sections being located between one of said heat conductor guided sections and another one of said heat conductor guided sections.

21. An electric heater for heating surfaces of components, the electric heater comprising:
an inner jacket with an inner jacket surface;
an outer metal jacket arranged relative to the inner jacket surface such that a space is present between the inner metal jacket and outer metal jacket;
at least one heat conductor arranged with heat conductor sections in the space between the inner metal jacket and the outer metal jacket;
at least two spacers between the heat conductor and the inner metal jacket, at least some of the heat conductor sections being guided sections, with each of the guided sections being guided over one of the at least two spacers, said heat conductor sections comprising unguided sections, in which the heat conductor is not guided over one of the spacers, each of said unguided sections being present between two of said guided sections, said spacers being arranged from each other in a circumferential direction with respect to a longitudinal axis of said inner metal jacket, each of said spacers extending in an axial direction of said inner metal jacket, each of said guided sections engaging at least a portion of one of said spacers, each of said unguided sections being free of contact with said spacers.

22. An electric heater, the electric heater comprising:
an inner jacket with an inner jacket surface;
an outer metal jacket, the outer jacket being arranged relative to the inner jacket surface to define a space between the inner metal jacket and outer metal jacket;
spacers between the heat conductor and the inner metal jacket;
a heat conductor arranged in the space between the inner metal jacket and the outer metal jacket, the heat conductor including heat conductor guided sections and heat conductor unguided sections, each of said heat conductor guided sections being guided over a corresponding one of the spacers, each of said heat conductor unguided sections bridging an unsupported spacer region between one of said spacers and another one of said spacers, wherein each of said unguided sections is located at a spaced location from each of said spacers, each of said spacers extending in an axial direction of said inner metal jacket, each of said spacers being located at a circumferentially spaced location from another one of said spacers with respect to a longitudinal axis of said inner metal jacket, each of said heat conductor unguided sections being located between one of said heat conductor guided sections and another one of said heat conductor guided sections.

* * * * *